United States Patent
Bork

(10) Patent No.: US 7,024,782 B1
(45) Date of Patent: Apr. 11, 2006

(54) ELECTRONIC DEVICE COMPASS OPERABLE IRRESPECTIVE OF LOCALIZED MAGNETIC FIELD

(75) Inventor: Stephan M. Bork, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/975,139

(22) Filed: Oct. 28, 2004

(51) Int. Cl.
*G01C 17/00* (2006.01)

(52) U.S. Cl. .................... 33/355 R; 702/150
(58) Field of Classification Search ............. 33/355 R, 33/361, 300, 301; 701/207–224; 702/92, 702/94, 150
See application file for complete search history.

(56) References Cited

U.S. PATENT DOCUMENTS

| | | | | |
|---|---|---|---|---|
| 5,075,864 | A * | 12/1991 | Sakai | 701/217 |
| 5,768,151 | A * | 6/1998 | Lowy et al. | 702/150 |
| 5,890,092 | A * | 3/1999 | Kato et al. | 701/216 |
| 6,259,990 | B1 * | 7/2001 | Shojima et al. | 701/209 |
| 6,930,715 | B1 * | 8/2005 | Mower | 348/239 |
| 2002/0152050 | A1 * | 10/2002 | Vann | 702/150 |
| 2004/0176925 | A1 * | 9/2004 | Satoh et al. | 702/150 |
| 2005/0184866 | A1 * | 8/2005 | Silver et al. | 701/207 |

* cited by examiner

*Primary Examiner*—G. Bradley Bennett
(74) *Attorney, Agent, or Firm*—Ronald O. Neerings; Wade James Brady, III; Frederick J. Telecky, Jr.

(57) ABSTRACT

An electronic device (10). The device comprises means (14) for displaying a compass directional bearing. The device also comprises means (18, 26, CAM) for determining the compass directional bearing unresponsive to a local magnetic field in which the electronic device is located, wherein the means for determining comprises image capturing circuitry.

36 Claims, 4 Drawing Sheets

US 7,024,782 B1

ELECTRONIC DEVICE COMPASS OPERABLE IRRESPECTIVE OF LOCALIZED MAGNETIC FIELD

CROSS-REFERENCES TO RELATED APPLICATION

Not Applicable.

STATEMENT REGARDING FEDERALLY SPONSORED RESEARCH OR DEVELOPMENT

Not Applicable.

BACKGROUND OF THE INVENTION

The present embodiments relate to electronic devices and are more particularly directed to a compass for use in an electronic device, where the compass is operable irrespective of the magnetic field in which the device is located.

Electronic devices are extremely prevalent and beneficial in today's society and are constantly being improved due to consumer and user demand. One technological example has been the portable or cellular telephone marketplace, which has seen great advances in the last many years. These devices have evolved beyond provision of voice services alone and are now accommodating greater amounts of data and are providing various additional features, more advanced operating systems, and additional programming. For example, so-called "smart phones" are envisioned as having a large impact on upcoming generations of cellular phones. Also, various personal digital assistants ("PDAs") are still succeeding in the marketplace and may do so for the foreseeable future. Further, the functionality of cellular phones and PDAs are now beginning to overlap with the possibility of a greater combination of the functionality of these devices into a single unit in the future.

With the advancement of the devices introduced above, various newer features are now being developed and implemented, as are known in the art. One feature that is now found in some cellular phones is a magnetically-responsive compass. As a compass, the device serves in the ordinary sense of such a component, that is, to present to the phone user an indication of the directionality of the physical orientation of the phone. In the present art, such a compass is constructed in part using an element (or elements) that is sensitive to the local magnetic field, that is, the field at the location of the phone. For example, one implementation uses a two-dimensional magneto-resistive measurement bridge, which changes its resistance in response to a change in the orientation of the bridge as influenced by the local magnetic field. Circuitry, such as a differential amplifier and an analog-to-digital converter, sense the voltage output of the bridge and translate that output into a corresponding directionality indication.

While the preceding approach to a cellular phone compass may prove a desirable feature in some instances, the present inventor has observed that it has certain drawbacks. For example, the magneto-resistive measurement bridge extends only in two dimensions, presumably to coincide with the two-dimensional nature of the circuit board(s) inside the phone. As such, the bridge might produce erroneous and indeed erratic indications if the phone is positioned in a manner that is not parallel to the earth's surface. As another example, because the bridge is responsive to local magnetic field, then the resulting output will produce an erroneous indication of direction when the phone is in a location that is subject to aberrations in the earth's magnetic filed or nearby metal objects that might distort the earth's magnetic field at the then-existing location of the phone. As still another example, both device cost and circuit board space are increased with the inclusion of the bridge circuit and its associated circuitry.

As a result of the preceding, there arises a need to address the drawbacks of the prior art as is achieved by the preferred embodiments described below.

BRIEF SUMMARY OF THE INVENTION

In one preferred embodiment, there is an electronic device. The device comprises means for displaying a compass directional bearing. The device also comprises means for determining the compass directional bearing unresponsive to a local magnetic field in which the electronic device is located, wherein the means for determining comprises image capturing circuitry.

Other aspects are also disclosed and claimed.

BRIEF DESCRIPTION OF THE SEVERAL VIEWS OF THE DRAWING

FIG. 1b illustrates a rear view of the wireless telephone handset 10 of FIG. 1a.

FIG. 4b illustrates the example of FIG. 4a after handset 10 rotates 90 degrees clockwise following its second location fix in FIG. 4a.

DETAILED DESCRIPTION OF THE INVENTION

The present invention is described below in connection with a preferred embodiment, namely as implemented into an electronic device that includes a compass that operates in response to various features in that electronic device. Thus, such a compass may be included in a cellular telephone or a personal digital assistant ("PDA"), by ways of example. Still other electronic devices may implement such aspects as well, as may be evident to one skilled in the art. Accordingly, it is to be understood that the following description is provided by way of example only and is not intended to limit the inventive scope.

Figure 1A:
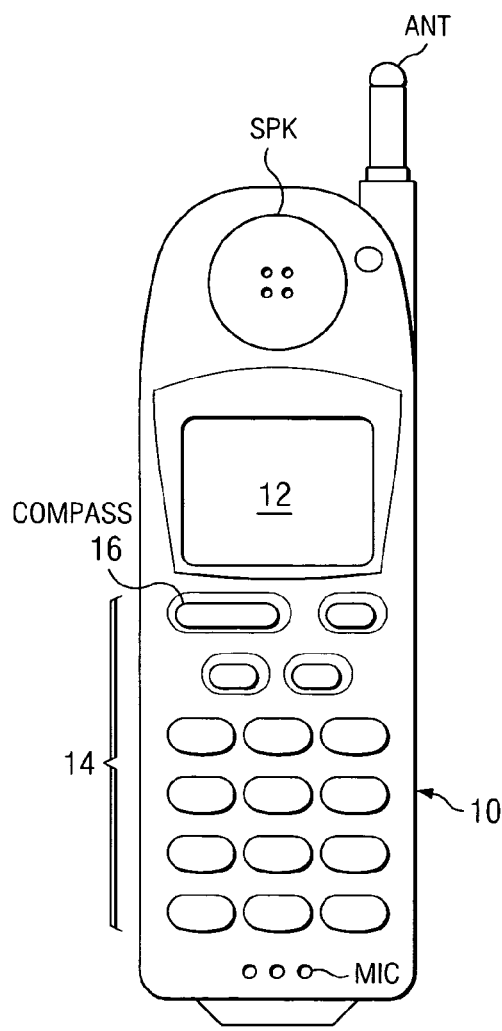
FIG. 1a illustrates a front view of an example of a wireless telephone handset 10 into which a preferred embodiment is implemented.

FIG. 1a illustrates a front view of an example of a wireless telephone handset 10 into which the preferred embodiments are implemented. Handset 10 includes an antenna ANT for bi-directional communications in the sense of a cellular or wireless device. However, only received signals are necessary for purposes of a compass function that is associated with the preferred embodiments and, thus, the preferred embodiments also may be implemented in connection with a device that is only operable to receive certain signals, described later, rather than to bi-directionally communicate signals such as in the case of a cellular telephone. In the example of FIGS. 1a (and 1b), handset 10 provides the conventional human interface features, including a microphone MIC, a speaker SPK, a visual display 12, and a keypad 14. Keypad 14 includes the usual keys for a wireless telephone handset, including numeric keys 0 through 9, the * and # keys, and other keys as in conventional wireless telephone handsets. In addition and for reasons more clear below, keypad 14 is shown to include a dedicated COMPASS key 16. According to the preferred embodiments of the invention, COMPASS key 16 may be pressed to invoke a compass feature whereby in response to that action and further processing described later, display 12 provides a visual indication of the directional heading of handset 10.

Figure 1B:
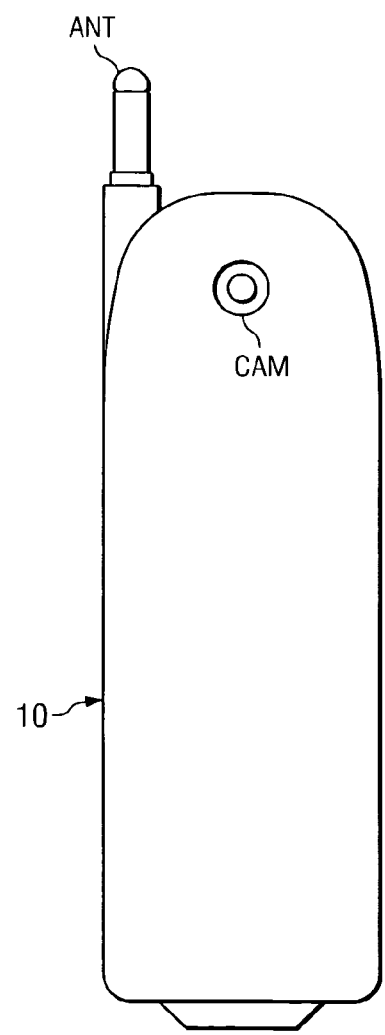

FIG. 1b illustrates a rear view of wireless telephone handset 10 from FIG. 1a. This rear perspective is shown to illustrate that handset 10 in the preferred embodiments also includes a camera CAM. As with many popular contemporary cellular phones, camera CAM is on the rear of handset 10, although such a location is not necessary. Further, the illustration of camera CAM in FIG. 1b is more particularly of its lens for sake of taking pictures (still or video), as further described later, and one skilled in the art should appreciate that within handset 10 additional circuitry in this regard is coupled to that lens as further described below.

Figure 2:
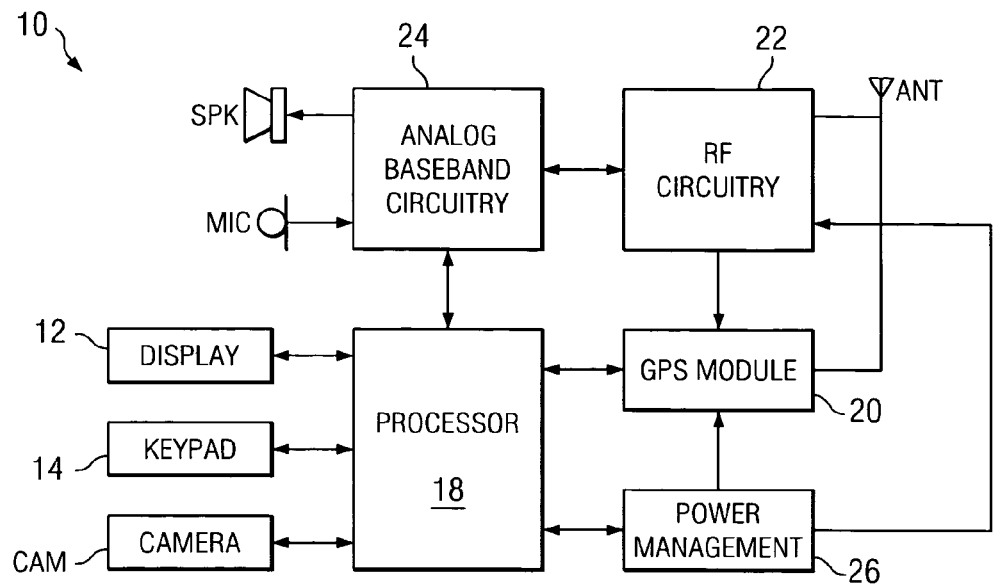
FIG. 2 illustrates an electrical block diagram of various functional features of handset 10.

Referring now to FIG. 2, the construction of an exemplary electrical block diagram architecture for handset 10 according to a preferred embodiment is now described. Of course, the particular architecture of a wireless handset (or other device within the inventive scope) may vary from that illustrated in FIG. 2, and as such the architecture of FIG. 2 is presented only by way of example.

As shown in FIG. 2, the functionality of handset 10 is generally controlled by a processor 18. Processor 18 may take various forms, including an implementation where it is embodied as a single integrated circuit that includes both a core and a digital signal processor ("DSP"). High-performance processors that are suitable for use as such a core include the advanced RISC ("reduced instruction set computer") machine ("ARM") designed by a company known as ARM Limited. Further, examples of DSPs suitable for such use include the TMS320c5x family of digital signal processors available from Texas Instruments Incorporated. In any event, the functionality of processor 18 preferably includes programmable logic, such as a microprocessor or microcontroller, that controls the operation of handset 10 according to a computer program or sequence of executable operations stored in program memory. Preferably, the program memory is on-chip with processor 18, but alternatively it may be implemented in read-only memory ("ROM") or other storage in a separate integrated circuit. The computational capability of processor 18 depends on the level of functionality required of handset 10, including the "generation" of wireless services for which handset 10 is to be capable. As known in the art, modern wireless telephone handsets can have a great deal of functionality, including the capability of Internet web browsing, email handling, digital still and video photography, global positioning system ("GPS") features, game playing, PDA functionality, and the like, as well as the additional compass functionality detailed later. The DSP functionality of processor 18 performs the bulk of the digital signal processing for signals to be transmitted and signals received by handset 10. These functions include the necessary digital filtering, coding and decoding, digital modulation, and the like. Lastly, note that DSPs that are comparable in various respects are available in combined form with the above-discussed core on a single integrated circuit as a combined processor referred to by Texas Instruments Incorporated as an OMAP, although in present form they do not include the compass functions detailed later.

Continuing the example of FIG. 2, processor 18 is coupled to visual display 12 and keypad 14, each for performing well-known functionality. In addition, and by way of introduction to aspects detailed later, a user may press COMPASS key 16 (see FIG. 1a) which is part of keypad 14, and that action invokes a control signal to processor 18 so that it may process various signals so as to provide a compass directional indicator on display 12. Continuing with other functions of FIG. 2. Processor 18 also is coupled to a power management function 20. Power management function 20 distributes regulated power supply voltages to various circuitry within handset 10 and manages functions related to charging and maintenance of the battery (not shown) of handset 10, including standby and power-down modes to conserve battery power. Handset 10 also includes radio frequency ("RF") circuitry 22, which is coupled to antenna ANT and to an analog baseband circuitry 24. RF circuitry 22 consumes power under control of power management function 20, and it includes such functions as necessary to transmit and receive the RF signals at the specified frequencies to and from the wireless telephone communications network that communicates with handset 10. Thus, RF circuitry 22 is contemplated to include such functions as modulation circuitry and RF input and output drivers. By applying the necessary filtering, coding and decoding, and the like, analog baseband circuitry 24 processes the signals to be transmitted (as received from microphone MIC) prior to modulation and the received signals (to be output over speaker SPK) after demodulation (hence in the baseband). Lastly, typical functions included within analog baseband circuitry 24 include an RF coder/decoder ("CODEC"), a voice CODEC, speaker amplifiers, and the like, as known in the art.

Handset 10 also includes a GPS module 26, which also consumes power under control of power management function 20 and is coupled to receive signals from RF circuitry 22 and to function generally according to the art to process those signals in connection with processor 18. Note that GPS is only used here by way of example, when in fact GPS is one example of a broader category of the satellite positioning system ("SPS"). Prior to its use in cellular phones, SPS has existed for decades and has been used in military and civil applications. The current SPS system includes the well-known US-owned global positioning satellite ("GPS") system or NAVSTAR and the Russia-owned Global Navigation Satellite System ("GLONASS"). Additionally, the European Union has started its effort to support SPS with an initiative to position a constellation of satellites, called the Galileo system, for completion in the future. In any event, many cellular phones are now including an SPS functionality, and for purposes of the preferred embodiments this functionality is shown by way of example as GPS, while it should be understood that the preferred embodiments may be implemented in connection with any SPS technique. In any event, and as detailed later, the GPS information provided in this manner also may be used in connection with a novel compass functionality. Looking presently to the GPS function in general, note that GPS features are now included in various cellular telephones to process GPS signals from a receiver, such as from the combination of antenna ANT and RF circuitry 22 or, alternatively, GPS module 26 may include its own RF circuitry, in which case module 26 may receive signals directly from antenna ANT, with such an alternative connection also being shown in FIG. 2. In either event, module 26 receives unidirectional communications from the satellite GPS system which, as known in the GPS art, is a constellation of a number of satellites that orbit the earth at a given angle relative to the equator. Each satellite transmits coded position and timing information in a low power signal and, in response, that information may be received by any GPS-enabled device, including handset 10. In the case of the latter, those signals are received by antenna ANT, converted by RF circuitry 22 and processed by GPS module 26, either alone or in combination with the capabilities of processor 18. Thus, one or the combination of these functional blocks preferably has a measurement engine and position engine from which a determination of a so-called location fix of handset 10 is determined, that is, the geographic coordinate position of handset 10. The accuracy of the location fix depends on various considerations, but even in a consumer-level device that accuracy may be on the order of one to two meters. Further, GPS location fix determinations may be improved in accuracy with supplementation from other GPS services, as known in the art. In any event, with the GPS location fix of the cellular phone, the phone may use that information for various applications. In one example, a contemporary standard requires that a phone such as handset 10 be operable to report its location in the event that its user calls the emergency 9-1-1 service and, thus, the GPS functionality of the phone supports this requirement. In another example, the GPS information may be used in connection with a mapping program associated with the phone (or other electronic device), so as to depict on display 12 the location of the phone (and its user) on a displayed map. As detailed below, however, this information is also used in part to support a novel compass functionality, that is, to provide a directional heading indication of handset 10.

Figure 3:
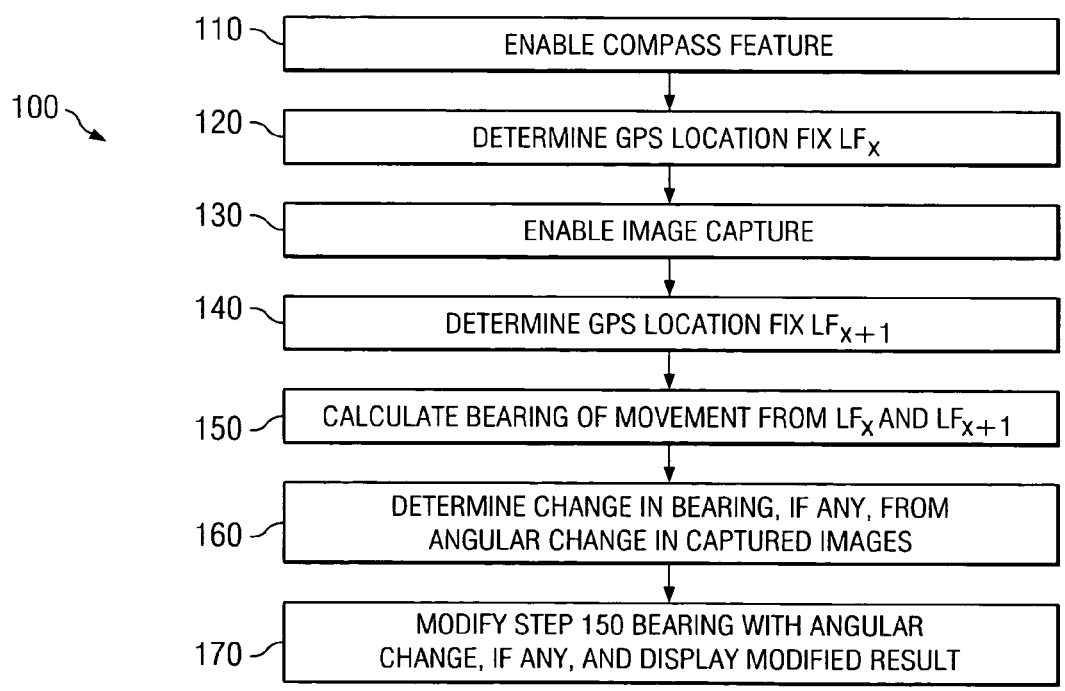
FIG. 3 illustrates a flowchart of a method 100 of operation of handset 10 in connection with providing a compass functionality in the inventive scope.

FIG. 3 illustrates a flowchart of a method 100 of operation of handset 10 in connection with providing a compass functionality in the inventive scope. By way of introduction, note that the use of a flowchart is merely to explain various functional concepts and steps, where the order of these steps may be adjusted and where they may be represented in an alternative fashion, such as in a state diagram. Moreover, the steps of FIG. 3 are only directed to certain aspects pertaining to the management of the compass functionality, while one skilled in the art will readily appreciate that various other functions may occur with respect to handset 10, either simultaneously or in addition to those set forth in FIG. 3. Note also that the compass functionality of method 100 may be achieved by including additional computer programming software in connection with processor 18 (e.g., in local or remote memory or other computer-readable medium), where that software operates with respect to data provided by already-existing hardware including GPS module 26 and camera CAM, but without reference to any magnetic-sensitive device as in the prior art. These aspects will be appreciated below, as will be manners of implementing such software by one skilled in the art.

Turning to method 100 of FIG. 3, it commences with a step 110, where the compass feature is enabled. In a preferred embodiment, the user of handset 10 may accomplish this task by pressing COMPASS key 16 (FIG. 1a). In an alternative embodiment, the compass selection may be programmed into another general purpose or programmable key or otherwise invoked by operating handset 10 in some desired manner, including navigating to a menu, interface, or the like on display 12. In any event, once the feature is enabled, method 100 continues from step 110 to step 120.

Figure 4A:
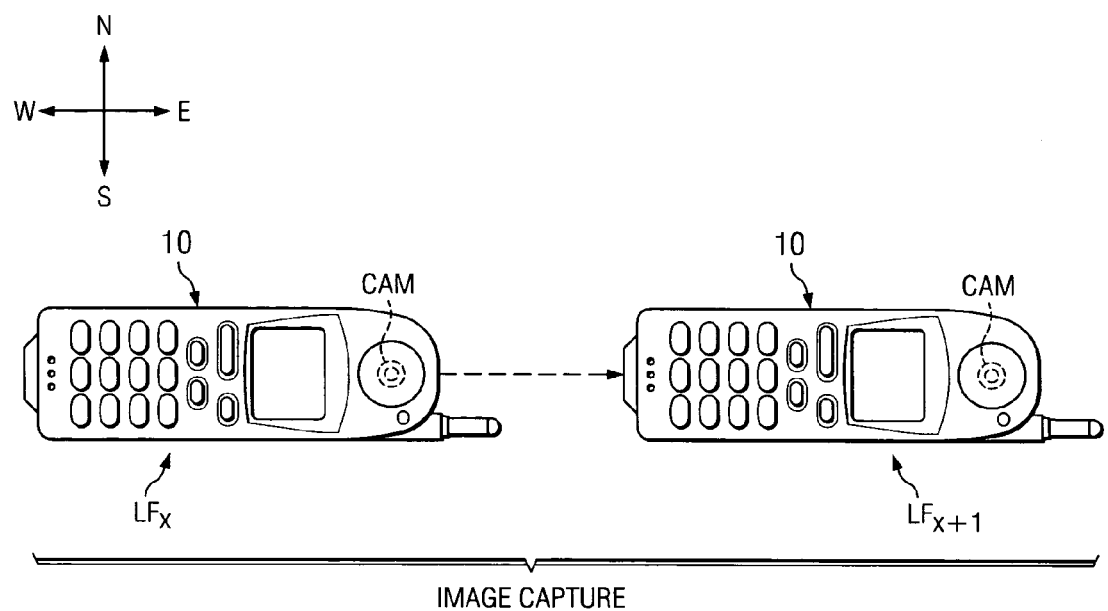
FIG. 4a illustrates an example of directional movement of handset 10 between two location fixes.
Figure 4B:
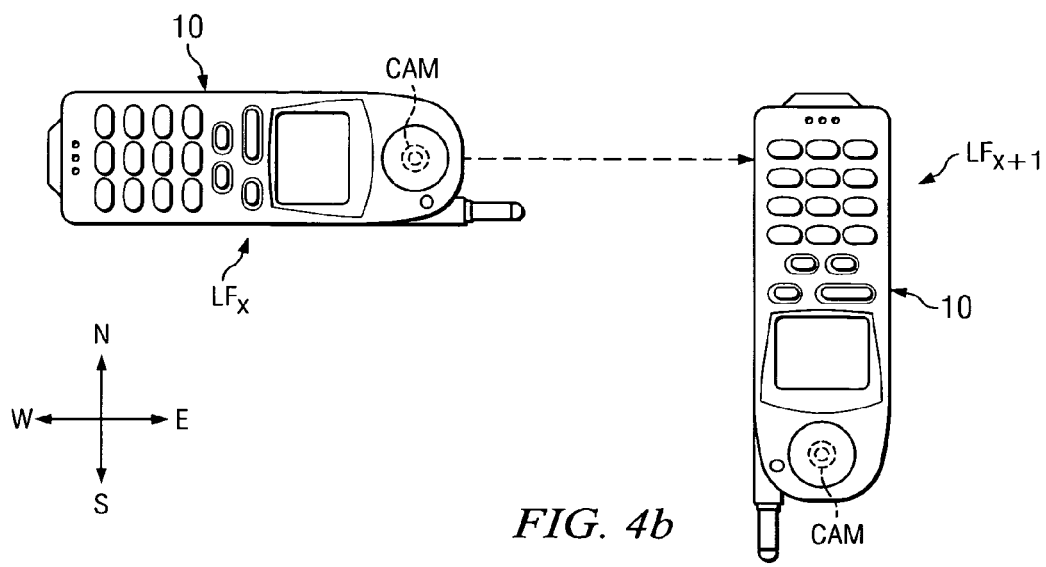
Figure 4C:
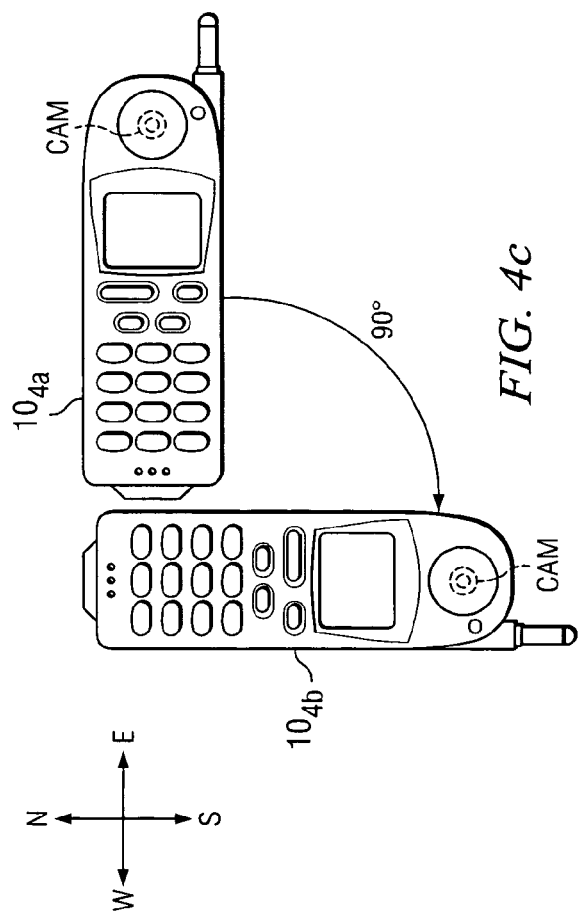
FIG. 4c illustrates the 90 degree clockwise rotation of handset 10 as occurring at the second location fix and from FIG. 4a to FIG. 4b.

In step 120, GPS module 26 determines a first location fix $LF_x$, that is, from signals received from RF circuitry 22 and with known GPS functionality, a first set of GPS geographic coordinates are determined for handset 10. Note that such functionality may be selected from various alternatives and, moreover, the rate at which first location fix $LF_x$ is determinable may depend on the supporting GPS methodology. For example, so-called assisted GPS now exists and may be incorporated into handset 10 so as to reduce the time needed to determine a first location fix. To further demonstrate step 120 and later steps, FIGS. 4a through 4c provide simplified top views of the positioning of handset 10 in different locations. Moreover, handset 10 is shown in those Figures in general form, with an outline of the handset and with camera CAM on its underside (as shown in FIGS. 4a through 4c with a dashed outline), facing generally downward toward the ground. Further in this regard and as appreciated with the remaining discussion, in the preferred embodiments a user of handset 10 is generally encouraged to position handset 10 in this manner while performing method 100, that is, in a horizontal manner, parallel to the ground and with camera CAM facing downward. As also appreciated later, however, modest deviations in the horizontal positioning of handset 10 will not interfere with its compass functionality. In any event, FIG. 4a illustrates handset 10 wherein the user (not shown) is pointing handset 10 with a bearing of east, and location fix $LF_x$ is determined from step 110 at that location. Thereafter, method 100 continues from step 120 to step 130.

In step 130, processor 18 enables camera CAM to begin to capture successive images in time. In a preferred embodiment, these successive images are captured as an ongoing video stream commencing with step 130. However, in an alternative embodiment, successive still images may be captured. Either approach may be achieved using many of various known or developed image techniques, such as through mpeg, jpeg, or other technologies as ascertainable by one skilled in the art. Looking again to FIG. 4a, therefore, image capture occurs at location fix $LF_x$ and continues as handset 10 is moved eastward. While image capture continues, method 100 continues from step 130 to step 140.

In step 140, GPS module 26 determines a second location fix $LF_{x+1}$, where the subscript is intended to denote that it follows the first location fix, $LF_x$, determined in step 120. Again, the same GPS functionality used to achieve step 120 is preferably used to achieve step 140. Thus, in FIG. 4a, step 140 occurs as shown to the right of the Figure, which depicts handset 10 at second location fix $LF_{x+1}$. Next, method 100 continues from step 140 to step 150.

In step 150, processor 18 determines the directional bearing (i.e., direction of movement) of handset 10 based on the difference of second location fix $LF_{x+1}$ and first location fix $LF_x$. In other words, these two points necessarily define a line and, thus, with a geographical coordinate for each, the directional bearing along that line may be determined. In the example of FIG. 4a, therefore, this direction is determined to be east, that is, handset 10 has been shown in that Figure to have been moved east, as will be confirmed by calculating the directional difference between $LF_{x+1}$ and $LF_x$. Note also in this regard that calculating direction based on different GPS fixes is known in the automotive art, where systems are now available that perform this function, although they do so with expectations about the fixed orientation of the receiver relative to the remainder of the vehicle (and the ground) as well as an anticipation of the vehicle traveling at speeds greater than that which would be expected from a human traveling without vehicle assistance and carrying a portable device such as handset 10. In any event, after step 150, method 100 continues from step 150 to step 160.

Step 160 is illustrated in connection with FIG. 4b. Turning first then to FIG. 4b, it is intended to demonstrate the two location fixes of FIG. 4a, but now it is shown that the user of handset 10 has rotated handset 10 by an amount of 90 degrees clockwise, where such movement is also shown by way of demonstration in FIG. 4c. Particularly, FIG. 4c illustrates handset 10 in a position $10_{4a}$, which is intended to illustrate the orientation of handset 10 at the end of its eastward movement in FIG. 4a, followed by a 90 degree clockwise rotation to a position $10_{4b}$, which is intended to illustrate the orientation of handset 10 after both its eastward movement in FIG. 4a and its 90 degree clockwise rotation shown in FIG. 4b. Thus, returning to FIG. 4b, it may be appreciated that while handset 10 previously moved east as was determined by step 150, the directional bearing of handset 10 is now south, given the 90 degree clockwise rotation. Returning then to FIG. 3 and step 160, it determines a difference in bearing, if any, from any angular change in images that have been or are being captured by camera CAM. In other words, assuming an image $IM_T$ captured at a time T, then step 160 evaluates that image based on a range R of other images, which may be before and/or after image $IM_T$ is captured; hence, step 160 is shown to make its determination relative to images $IM_T + IM_R$. For example, assume that a number N of images are captured between the time handset 10 is positioned as shown at location fix $LF_{x+1}$ in FIG. 4a and as shown at location $LF_{x+1}$ in FIG. 4b, that is, assume N images are captured through the range of the 90 degree rotation of handset 10. In this or other cases, then in step 160, various image processing techniques, including by ways of example extrapolation and interpolation techniques used in mpeg (or the like) video processing, are employed to determine from those N images the direction and extent of the angular rotation of handset 10, thereby providing a corresponding determination of the change in directional bearing of handset 10. Indeed, note that this image processing also may account for modest variations in the horizontal orientation of handset 10, that is, if the user while carrying handset 10 departs from the intended preference of holding it in a horizontal manner, then sufficient image capture and processing may well be able to account for such deviations, while still providing a determination of the change, if any, in directional orientation of handset 10. Next, method 100 continues from step 160 to step 170.

In step 170, processor 18 modifies the directional bearing from step 150 with the difference in bearing, if any, based on the captured images. The result is provided to user 10, such as through display 12 or through some other means of depicting direction to that user. Thus, returning once more to FIG. 4a, step 150 will have determined a directional bearing of east. However, the subsequent step 160 will have determined a 90 degree clockwise rotation of handset 10, which is used in step 170 to modify the step 150 directional bearing, thereby changing it from an east bearing to a south bearing. The result of south, therefore, is presented to the user of handset 10 via display 12. The presentation may take various forms. In one embodiment, the presentation may be an indication of directional bearing by a letter or arrow or depicted on a screen displayed compass or directional arrow. In another embodiment, the presentation may locate a directional indicator on a map that shown the geographic location in which handset 10 is located.

Figure 5:
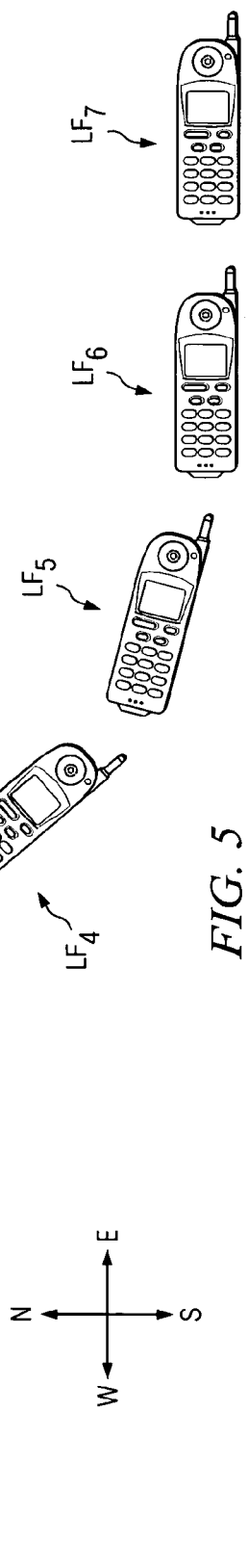
FIG. 5 illustrates an example of directional movement of handset 10 along a curve with numerous location fixes.

The preceding illustrates that method 100, as shown in the example of FIGS. 4a through 4c, permits handset 10 to determine a directional bearing in response to location fixes and successive image data, all provided by circuitry and software within handset 10. Note various additional benefits of these preferred embodiments. First, the example of FIGS. 4a through 4c is only one of many instances in which method 100 may operate. Indeed, note that the timing between successive location fixes and the image capture may be shortened or lengthened so as to adjust accuracy as well as directional bearing updates. For example, FIG. 5 illustrates another example of directional movement of handset 10, handset 10 is shown traversing along a curve that in different instances corresponds to various different directional bearings. In that example, a total of seven location fixes are taken. Thus, as between each successive location fix, a straight line might indicate the previous general direction of movement of handset 10, but because of the curvature of the route the then-existing actual bearing (or orientation) of handset 10 may differ to due its rotation of the actual physical device as it travels along the curve. However, with sufficient image capture this additional rotation may be ascertained as explained above in connection with step 160 and the directional bearing may be modified in the corresponding step 170. Thus, many other instances and examples should be appreciated by one skilled in the art, as should the notion that method 100 may be continuously repeated, with or without requiring a repetition of user-input such as through step 110, whereby handset 10 continuously updates its directional bearing by using successive or incremental location fixes as well as captured image data.

From the above, it may be appreciated that the preferred embodiments provide a compass for use in an electronic device. Because the compass of the preferred embodiments determines directional bearing based on GPS and image data, it is operable irrespective of the magnetic field in which handset 10 is located. In other words, the compass functionality is unresponsive to the magnetic field that is influencing the location of handset 10. For this reason, the preferred embodiments provide various benefits as compared to the prior art. As one example of a benefit, additional magnetic-responsive devices, which may add cost, complexity, size, and weight to a portable device are not required in handset 10. As another example of a benefit, the preferred embodiments provide a compass functionality that is not susceptible to magnetic field variations that would adversely affect a typical magnetic-responsive compass. For example, there may be local magnetic attractions if handset 10 is in the vicinity of something made of iron or a comparably field influencing substance or device. As another example, there may be localized aberrations in the earth's magnetic field, and still further there is the possible influence on magnetic-responsive devices of the different North Poles, that is, True North and Magnetic North. Nonetheless, the preferred embodiments as shown above are unresponsive to these localized magnetic effects and, therefore, can prove meaningful compass functionality in such locations without a disturbance in the accuracy of the compass. As yet another benefit, many contemporary cellular telephones already include both GPS and camera functionality and, thus, in these devices, the preferred embodiments may be implemented by adding purely software into these devices to program them to operate as described above. Thus, the preferred embodiments include various aspects and advantages as compared to the prior art, and still others will be appreciated by one skilled in the art. Moreover, while the preferred embodiments have been shown by way of example, certain other alternatives have been provided and still others are contemplated. Thus, the preceding discussion and these examples should further demonstrate that while the present embodiments have been described in detail, various substitutions, modifications or alterations could be made to the descriptions set forth above without departing from the inventive scope which is defined by the following claims.

The invention claimed is:

1. An electronic device, comprising:
   means for displaying a compass directional bearing; and
   means for determining the compass directional bearing unresponsive to a local magnetic field in which the electronic device is located, wherein the means for determining comprises image capturing circuitry.

2. The device of claim 1 wherein the means for determining comprises:
   a computer program; and
   a processor operable to process the computer program at least in part to determine the compass directional bearing.

3. The device of claim 2 and further comprising SPS circuitry for determining location fixes of the electronic device, wherein the processor is operable to process the computer program to determine the compass directional bearing in response to the location fixes.

4. The device of claim 2, wherein the processor is operable to process the computer program to determine the compass directional bearing in response to images captured by the image capturing circuitry.

5. The device of claim 4 wherein the image capturing circuitry comprises still image capturing circuitry.

6. The device of claim 4 wherein the image capturing circuitry comprises video image capturing circuitry.

7. The device of claim 4 wherein the processor is operable to process the computer program to determine the compass directional bearing in response to either extrapolation or interpolation of the images.

8. The device of claim 2 and further comprising:
   SPS circuitry for determining location fixes of the electronic device; and
   image capturing circuitry; and
   wherein the processor is operable to process the computer program to determine the compass directional bearing in response to the location fixes and images captured by the image capturing circuitry.

9. The device of claim 8 wherein the image capturing circuitry comprises still image capturing circuitry.

10. The device of claim 8 wherein the image capturing circuitry comprises video image capturing circuitry.

11. The device of claim 8 wherein the processor is operable to process the computer program to determine the compass directional bearing in response to either extrapolation or interpolation of the images.

12. The device of claim 2 wherein the processor comprises a core and a digital signal processor.

13. The device of claim 2 wherein the means for displaying and means for determining are part of an electronic device selected from a set consisting of a telephone and a personal digital assistant.

14. The device of claim 1 wherein the means for displaying and means for determining are part of an electronic device selected from a set consisting of a telephone and a personal digital assistant.

15. The device of claim 1 wherein the means for displaying comprises means for displaying the compass directional bearing on a depiction of a map.

16. The device of claim 1 wherein the image capturing circuitry comprises still image capturing circuitry.

17. The device of claim 1 wherein the image capturing circuitry comprises video image capturing circuitry.

18. An electronic device, comprising:
    a computer program; and
    a processor operable to process the computer program at least in part to determine a compass directional bearing at least in part in response to image data and unresponsive to a local magnetic field in which the electronic device is located.

19. The device of claim 18 and further comprising SPS circuitry for determining location fixes of the electronic device, wherein the processor is operable to process the computer program to determine the compass directional bearing in response to the location fixes.

20. The device of claim 18 and further comprising image capturing circuitry for providing the image data, wherein the processor is operable to process the computer program to determine the compass directional bearing in response to images captured by the image capturing circuitry.

21. The device of claim 18 wherein the image capturing circuitry is selected from a set consisting of still image capturing circuitry and video image capturing circuitry.

22. The device of claim 21 wherein the processor is operable to process the computer program to determine the compass directional bearing in response to either extrapolation or interpolation of the images.

23. The device of claim 18 and further comprising:
    SPS circuitry for determining location fixes of the electronic device; and
    image capturing circuitry; and
    wherein the processor is operable to process the computer program to determine the compass directional bearing in response to the location fixes and images captured by the image capturing circuitry.

24. The device of claim 23 wherein the image capturing circuitry is selected from a set consisting of still image capturing circuitry and video image capturing circuitry.

25. The device of claim 23 wherein the processor is operable to process the computer program to determine the compass directional bearing in response to either extrapolation or interpolation of the images.

26. The device of claim 18 wherein the processor comprises a core and a digital signal processor.

27. The device of claim 18 wherein the means for displaying and means for determining are part of an electronic device selected from a set consisting of a telephone and a personal digital assistant.

28. The device of claim 18 wherein the image capturing circuitry is selected from a set consisting of still image capturing circuitry and video image capturing circuitry.

29. Computer programming for use in an electronic device comprising a processor, the programming for causing the steps of:
    determining a compass directional bearing at least in part in response to image data and unresponsive to a local magnetic field in which the electronic device is located; and
    displaying the compass directional bearing.

30. The computer programming of claim 29, wherein the electronic device further comprises SPS circuitry for determining location fixes of the electronic device, wherein the determining step determines the compass directional bearing in response to the location fixes.

31. The computer programming of claim 29, wherein the electronic device further comprises image capturing circuitry, wherein the determining step determines the compass directional bearing in response to the image data as captured by the image capturing circuitry.

32. The computer programming of claim 31 wherein the image capturing circuitry comprises still image capturing circuitry.

33. The computer programming of claim 31 wherein the image capturing circuitry comprises video image capturing circuitry.

34. The computer programming of claim 29, wherein the electronic device further comprises SPS circuitry for determining location fixes of the electronic device and image capturing circuitry, wherein the determining step determines the compass directional bearing in response to the location fixes and images captured by the image capturing circuitry.

35. The computer programming of claim 34 wherein the image capturing circuitry is selected from a set consisting of still image capturing circuitry and video image capturing circuitry.

36. The computer programming of claim 29 wherein the displaying step displays the compass directional bearing on a depiction of a map.

* * * * *